(12) United States Patent
Höfer et al.

(10) Patent No.: US 12,523,465 B2
(45) Date of Patent: Jan. 13, 2026

(54) METHOD AND DEVICE FOR OPTICALLY MEASURING A THREAD

(71) Applicant: SMS group GmbH, Düsseldorf (DE)

(72) Inventors: Michael Höfer, Niederkrüchten (DE); Frank D'Hone, Cologne (DE); Christian Holländer, Niederkrüchten (DE)

(73) Assignee: SMS group GmbH, Düsseldorf (DE)

( * ) Notice: Subject to any disclaimer, the term of this patent is extended or adjusted under 35 U.S.C. 154(b) by 180 days.

(21) Appl. No.: 18/549,284

(22) PCT Filed: Feb. 18, 2022

(86) PCT No.: PCT/EP2022/054059
§ 371 (c)(1),
(2) Date: Sep. 6, 2023

(87) PCT Pub. No.: WO2022/189122
PCT Pub. Date: Sep. 15, 2022

(65) Prior Publication Data
US 2024/0183653 A1 Jun. 6, 2024

(30) Foreign Application Priority Data
Mar. 8, 2021 (DE) ...................... 10 2021 202 213.8

(51) Int. Cl.
*G01B 11/24* (2006.01)
*G01B 11/22* (2006.01)
*G01B 11/27* (2006.01)

(52) U.S. Cl.
CPC .......... *G01B 11/2425* (2013.01); *G01B 11/27* (2013.01); *G01B 11/22* (2013.01); *G01B 11/2408* (2013.01)

(58) Field of Classification Search
CPC ..... G01B 11/2425; G01B 11/27; G01B 11/22; G01B 11/2408; G01B 11/245
See application file for complete search history.

(56) References Cited

U.S. PATENT DOCUMENTS 5,291,272 A * 3/1994 Demirsu ................ G01B 11/08
356/639
5,521,707 A 5/1996 Castore et al.
(Continued)

FOREIGN PATENT DOCUMENTS

CN 103235553 A 8/2013
DE 102007017747 A1 10/2008
(Continued)

OTHER PUBLICATIONS

Feldmeyer et al "Device For Measuring Longitudinal Products", Apr. 14, 1999, EP 0908698 A2 (Year: 1999).*
(Continued)

Primary Examiner — Sang H Nguyen
(74) Attorney, Agent, or Firm — Smartpat PLC

(57) ABSTRACT

A method and a device can be used for optically measuring a thread on an end of a metal pipe by at least one measuring head which is fastened to a manipulator. The measuring head is preferably freely positionable in relation to the metal pipe and has at least one optical measuring path for measuring the thread and at least one position detector. The method includes at least the following method steps: A) providing the metal pipe in a measurement position; B) determining the spatial position of a longitudinal axis of the metal pipe by means of the at least one position detector before and/or while the measuring head is positioned in a measurement position; C) aligning the measuring head parallel to the longitudinal axis of the metal pipe before and/or while the (Continued)

measuring head is positioned in the measurement position; and D) carrying out the optical thread measurement.

8 Claims, 3 Drawing Sheets

(56) References Cited

U.S. PATENT DOCUMENTS

| | | | |
|---|---|---|---|
| 2010/0182424 | A1 | 7/2010 | Gschwendtner et al. |
| 2011/0164244 | A1 | 7/2011 | Honda et al. |
| 2011/0293169 | A1* | 12/2011 | Bonadeo ............ G01B 11/2425 382/152 |
| 2013/0258046 | A1* | 10/2013 | Nygaard ................ F42B 35/00 348/36 |
| 2014/0355004 | A1 | 12/2014 | Sakai et al. |
| 2015/0292872 | A1 | 10/2015 | Tripp et al. |
| 2017/0307541 | A1* | 10/2017 | Offenborn ............... B07C 5/342 |
| 2019/0101889 | A1 | 4/2019 | Riek et al. |
| 2019/0137264 | A1* | 5/2019 | Sauerland .......... G01B 11/2425 |
| 2020/0134997 | A1 | 4/2020 | Ooki et al. |
| 2020/0284577 | A1* | 9/2020 | Klarner ................ G01B 11/245 |
| 2023/0302559 | A1 | 9/2023 | Schmitz et al. |
| 2024/0337481 | A1 | 10/2024 | Sauerland et al. |

FOREIGN PATENT DOCUMENTS

| | | |
|---|---|---|
| DE | 102009014766 B4 | 9/2010 |
| EP | 2259015 A1 | 12/2010 |
| EP | 2392896 A1 | 12/2011 |
| EP | 2767799 A1 | 8/2014 |
| EP | 2799809 A1 | 11/2014 |
| EP | 2887010 A1 | 6/2015 |
| EP | 3465079 A1 | 10/2019 |
| JP | S63191007 A | 8/1988 |
| JP | H10142335 A | 5/1998 |
| JP | 2010038554 A | 2/2010 |
| JP | 2016075502 A | 5/2016 |
| KR | 101368486 B1 | 3/2014 |
| WO | 2012069154 A1 | 5/2012 |
| WO | 2016000764 A1 | 1/2016 |
| WO | 2019009371 A1 | 1/2019 |
| WO | 2019009371 A1 | 5/2019 |
| WO | 2020232041 A1 | 11/2020 |
| WO | 2021055736 A1 | 3/2021 |

OTHER PUBLICATIONS

Alan Richter, "Automating thread inspection on tubular goods," Published Jan. 24, 2017, retrieved from https://www.ctemag.com/articles/automating-thread-inspection-tubular-goods on Jun. 18, 2025.

Falk Rösseler, Four questions about the TCG thread cutting machine for OCTG pipes, SMS Group magazine, Oct. 20, 2020, retrieved from https://www.sms-group.com/en-us/insights/all-insights/four-questions-about-the-tcg-thread-cutting-machine-for-octg-pipes on Mar. 20, 2023.

Frank D'hone, ThreadView: Autonomous measuring system for OCTG threads and sealing lips, SM Group magazine, Mar. 11, 2020, retrieved from https://www.sms-group.com/insights/all-insights/threadview-autonomous-measuring-system-for-octg-threads-and-sealing-lips Mar. 20, 2023.

Peter Zelinski, Video: In-Process Scanning of a Turned Profile—via Robot, Published Oct. 22, 2010, text and images retrieved from https://www.mmsonline.com/videos/video-in-process-scanning-of-a-turned-profilevia-robot on Jun. 18, 2025.

Unknown author, "AGU CSA Certification," dated Jun. 24, 2015, retrieved from https://autonetics.com/agu-csa-certification/ on Jun. 18, 2025.

Unknown author, "Automated Thread Gauge," dated Dec. 28, 2018, retrieved from https://autonetics.com/projects/automated-thread-gauge/ on Jun. 18, 2025.

Unknown author, "Thread Gauging Systems," dated Oct. 23, 2011; retrieved from https://autonetics.com/thread-gauging-systems/ Jun. 18, 2025.

Unknown author, "AGU 4 Demonstration," dated Jul. 11, 2017, retrieved from https://autonetics.com/agu-4-demonstration/ on Jun. 18, 2025.

Unknown author, "Autonetics at Okuma Tech Show," dated Nov. 9, 2016, retrieved from https://autonetics.com/autonetics-at-okuma-tech-show/ on Jun. 18, 2025.

Unknown author, "Autonetics Stand-Alone Gauging Units (SGU)," dated Jan. 1, 2014, retrieved from https://autonetics.com/autonetics-stand-alone-gauging-units-sgu/ on Jun. 18, 2025.

Unknown author, "In-Process Inspection: Lathes," dated Sep. 28, 2016, retrieved from https://autonetics.com/in-process-inspection-lathes/ on Jun. 18, 2025.

Unknown author, "In-Process Non-Contact Robotic Gaging," dated Jul. 16, 2010, retrieved from https://autonetics.com/in-process-non-contact-robotic-gaging/ on Jun. 18, 2025.

Unknown author, "The V Series SGU," dated Sep. 2, 2014, retrieved from https://autonetics.com/the-v-series-sgu/ on Jun. 18, 2025.

Unkwown author, "Building Success in 2011," dated Jan. 3, 2011, retrieved from https://autonetics.com/building-success-in-2011/ Jun. 18, 2025.

User Manual, Automated Gauging Unit (AGU) Series 3.0, Release: 3.1.2 Date: May 10, 15 , retrieved from http://autoneticsllc.com/images/PDF/Manual.pdf on Jun. 18, 2025.

* cited by examiner

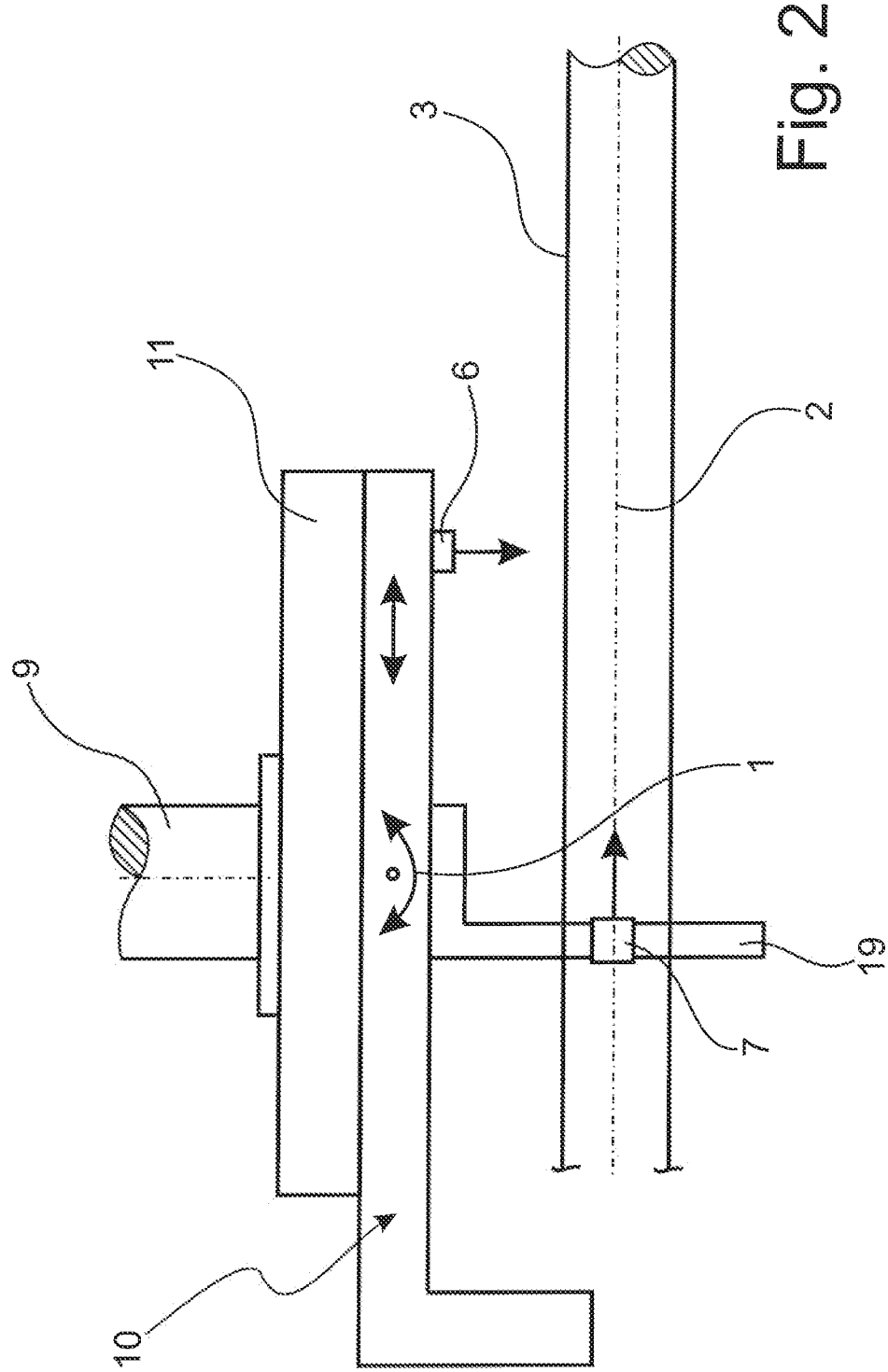

METHOD AND DEVICE FOR OPTICALLY MEASURING A THREAD

CROSS-REFERENCE TO RELATED APPLICATION

This application is a national stage application, filed under 35 U.S.C. § 371, of International Patent Application PCT/EP2022/054059, filed on Feb. 18, 2022, which claims the benefit of German Patent Application DE 10 2021 202 213.8, filed on Mar. 8, 2021.

TECHNICAL FIELD

The disclosure relates to a method for optically measuring a thread on an end of a metal pipe by means of at least one measuring head which is fastened to a manipulator and freely positionable in relation to the metal pipe.

The disclosure further relates to a device for optically measuring a thread, in particular for carrying out the method.

BACKGROUND

The threads of pipes used for transporting pressurized fluids, such as natural gas or crude oil, which are bolted together in a pressure-resident, gas-tight and liquid-tight manner, are subject to stringent requirements for leak-tightness. With such OCTG (oil country tubular goods) tubes as casing tubes or riser tubes for oil or gas exploration wells or natural gas or oil production pipelines, conical threads with undercut thread flanks are typically used. A sealing lip is usually attached to the threads on the front side of the pipe. Both the thread and the sealing lip must meet the highest precision requirements. In the prior art, in principle it is known to optically measure the threads for quality control of the pipes.

A method and a device for optically measuring the external thread profile of pipes is known, for example, from WO 2019/09371 A1. The device comprises a support for the pipe to be measured and an optical measurement unit with at least one measuring device, which comprises a light source and a camera arranged in the beam path of the light source for recording a shadow image of the external thread profile, wherein the optical measurement unit is rigidly arranged on a support element that is held pivotably about three spatial axes, wherein, furthermore, the optical measurement unit has at least two measuring devices whose beam paths cross one another. The method comprises arranging the pipes to be measured on a support, such that the spatial axis runs transversely with respect to a measuring plane of the measurement unit and the external thread is arranged in the beam path between the light sources and the associated cameras, aligning the measurement unit in such a manner that the measuring plane encloses a right angle with the spatial axis, recording shadow images of the external thread by means of the camera of at least one measuring device, and evaluating the shadow images.

Another device for measuring a thread is known, for example, from EP 3 465 079 B1. The device comprises a holder for releasably holding a pipe, wherein the thread is formed at one end of the pipe, a first optical measuring path having a first optical sensor, wherein the first optical measuring path is mounted on a manipulator of the device, which is configured to move the first measuring path relative to the pipe, and wherein the first optical measuring path is adjustable about a first adjustment axis relative to a thread axis of the thread, wherein a second optical measuring path of the device with a second optical sensor is arranged on the manipulator, wherein the optical measuring paths altogether form a measuring channel for the simultaneous measurement of opposite sides of the thread. The device is characterized in particular by the fact that the measuring channel may be tilted by means of the manipulator about at least a second adjustment axis relative to the thread axis, such that the measuring channel may be freely aligned within a solid angle interval.

DE 10 2007 017 747 A1 describes a method and a device for the optical measurement of an external thread profile at the end of a pipe, with which the threads are previously created in a clocked manner in a production line and are continuously measured from the beginning to the end of the thread before further processing in line. The profile of the previously created thread is illuminated or scanned, as the case may be, tangentially to the cross-section of the pipe via a relative movement consisting of rotation and translation between the pipe and at least one optical measurement unit consisting of illumination and camera arranged in backlight.

Further prior art is known from EP 2 259 015 B1, which describes a combination of tactile measurement and optical measurement of pipe threads.

Finally, a method for cleaning and subsequently measuring a flank surface of a thread is known from EP 2 799 809 B1.

SUMMARY

When measuring threads, the metal pipe to be measured is usually placed in a measurement position, in which the position of the thread in space is not exactly defined. This also results from the fact that the pipe to be measured has tolerances with regard to straightness or that the end of the pipe hangs down due to the weight force if the pipe is not supported over its entire length by a support. This affects the accuracy and reproducibility of the measurement.

Therefore, the disclosure is based on the object of providing a method and a device for optical thread measurement, which are improved with regard to the accuracy and reproducibility of the measurement results. Further, the method and device are intended to be easily and accurately adaptable to the measurement of various threads on metal pipes of various diameters.

The object is achieved by a method as disclosed and claimed. The object is further achieved by a device as disclosed and claimed.

According to a first aspect, a method is proposed, with which the measuring head is freely positionable in relation to the metal pipe and the measuring head comprises at least one optical measuring path and at least one position detector. The method comprises at least the following method steps:
  A) providing the metal pipe in a measurement position,
  B) determining the spatial position of a longitudinal axis of the metal pipe by means of the at least one position detector before and/or while the measuring head is approaching the metal pipe,
  C) aligning the measuring head parallel to the longitudinal axis of the metal pipe before and/or while the measuring head is positioned in the measurement position, and
  D) carrying out the optical thread measurement.

The method steps A) to D) listed above are preferably carried out in the order in which they are listed, wherein the order of method steps B) and C) are interchangeable.

Preferably, the at least one position detector is arranged on the measuring head in such a manner that, when the measuring head approaches the thread to be measured or the metal pipe to be measured, as the case may be, it is arranged at a leading end of the measuring head relative to the adjustment path covered by the measuring head in the direction of the metal pipe to be measured. In this manner, the measuring head may be aligned parallel to the longitudinal axis of the metal pipe while still approaching the thread, for example by corresponding control of the manipulator, to which the measuring head is fastened.

In a preferred variant of the method, a further method step is provided, which comprises a fine alignment of the measuring head and/or the measuring path of the measuring head in the measurement position at a specific and given angle and/or in a specific axial position in relation to the longitudinal axis of the metal pipe.

The position detector is preferably at least one optical measuring means, in particular a first line laser, which is preferably aligned at a right angle to a target course of the longitudinal axis of the metal pipe or to a provided linear adjustment of the measuring head, as the case may be.

With a further expedient and preferred variant of the method, it is provided that the determination of the spatial position of the longitudinal axis of the metal pipe and/or the fine alignment of the measuring head and/or the at least one optical measuring path is carried out using at least one second line laser on the measuring head, which is aligned parallel to a target course of the longitudinal axis of the metal pipe.

In principle, the measuring head may also comprise a third line laser or light section sensor, which is provided for measuring the thread flanks or the flank angles, as the case may be, of the thread.

Furthermore, it may be provided that the diameter of the metal pipe is measured and/or calculated, for example, during the positioning of the measuring head into the measurement position. The diameter of the metal pipe may be determined directly, for example by means of the optical measuring paths of the measuring head.

With a further advantageous variant of the method, it is provided that the roundness of the metal pipe is determined during a rotation of the measuring head over a predetermined target course of the longitudinal axis of the metal pipe. Due to the thread cutting process, for example in a machining center, the metal pipe to be machined may be out-of-round after the machining process or have a partially oval shell contour. Such out-of-roundness of the metal pipe may be determined during a rotation of the measuring head over a certain angle around the longitudinal axis of the metal pipe, for example either with the aid of at least one line laser and/or with the aid of at least one optical measuring path.

With a variant of the method, it is provided that during a rotation of the measuring head of at least 180° about the target course of the longitudinal axis of the metal pipe, a deviation of an actual thread depth from a target thread depth is measured over the circumference of the metal pipe by means of at least one, preferably by means of both optical measuring paths. By rotating the measuring head by approximately 180° around the target course of the longitudinal axis of the metal pipe, a 360° scan as a whole of the thread may be generated with the aid of two opposing optical measuring paths.

The deviation of the thread depth over the circumference of the metal pipe may also be used to calculate an angular offset of the actual course of the longitudinal axis of the metal pipe from the target course of the longitudinal axis of the metal pipe.

The measuring head and/or the measuring path may be adjustable relative to a carrier, which may be fastened to a free end of the manipulator, for fine alignment of the measuring head and/or the measuring path. Preferably, the positioning of the measuring head in the measurement position is initially performed by a corresponding control of the manipulator, which is designed, for example, as an industrial robot with an articulated arm mechanism movable in a plurality of degrees of freedom. The fine alignment of the measuring head or the optical measuring path, as the case may be, is preferably performed by adjusting the measuring head relative to the carrier, wherein the measuring head is preferably both linearly adjustable and pivotable with respect to the carrier. The measuring head is preferably pivotable about an axis that extends approximately perpendicularly to the target course of the longitudinal axis of the metal pipe.

With a particularly advantageous variant of the method, it is provided that the measuring head has two measuring paths extending preferably approximately parallel and at a distance from one another, the distance of which is adjustable in relation to the longitudinal axis of the metal pipe, wherein the distance preferably is adjusted automatically as a function of the determined and/or calculated diameter of the metal pipe. In this manner, it is particularly easy to calibrate the device to different pipe diameters. Calibration may be undertaken, for example, using a test specimen arranged in a measurement station.

Preferably, a further method step comprises a manual and/or automatic adjustment of at least one optical measuring path about an axis perpendicular to the target course of the longitudinal axis of the metal pipe for the purpose of adapting the measuring head to the specified pitch angle of the thread.

Furthermore, a collision detection in relation to diameter and position of the metal pipe is preferably provided during the positioning of the measuring head into the measurement position, which blocks a further movement of the measuring head and/or the manipulator if a possible collision of the measuring head with the metal pipe is detected. This prevents the sensitive measuring electronics from being affected by shock-related forces.

Finally, with a variant of the method, a preferably automatic detection of the contamination of at least one optical measuring path is provided. As a function of a detected degree of contamination, either a cleaning process may be initiated or a functional interruption of the measuring process is provided. As the degree of contamination of, for example, the glass covers of the sensors or the light sources increases, the respective sensor may determine the degree of obscuration in the form of so-called "gray scale detection." With the method, it is provided to clean the glass covers automatically on a regular basis, for example pneumatically. Depending on the degree of contamination, an additional cleaning process may be initiated. Above a predetermined degree of contamination, a measurement may no longer be carried out reliably. In such a case, it makes sense to abort the measuring process. Optical sensors of the measuring paths may, for example, be designed as CCD or CMOS sensors.

An additional aspect of the disclosure relates to a device for optically measuring a thread on at least one end of a metal pipe, in particular a device for carrying out the method described above. The device may comprise at least one measuring head guided on a manipulator and freely positionable in relation to the metal pipe, which measuring head has at least one optical measuring path for measuring the thread along with at least one position detector, wherein the measuring head is mounted so as to be linearly adjustable and/or pivotable about an axis relative to a carrier fastened to the manipulator and the at least one optical measuring path extends approximately perpendicularly to the linear adjustment path of the measuring head, wherein the device further comprises means for adjusting and/or calibrating the measuring head and/or the measuring path of the measuring head in a measurement position.

For example, at least one linear drive and/or at least one rotary drive may be provided as means for adjusting and/or calibrating the measuring head, which may be controlled accordingly by a controller.

It is expedient that an industrial robot with an articulated arm having a plurality of degrees of freedom is provided as the manipulator.

At least one first line laser may be provided as a position detector, which first line laser extends approximately at right angles to the linear adjustment path of the measuring head.

Preferably, at least one collision detector is provided, which blocks the adjustment of the measuring head and/or movement of the manipulator if the measuring head or parts of the measuring head threaten to collide with the metal pipe. At least one of the line lasers of the position detector may simultaneously fulfill the functionality as a collision detector.

Expediently, the measuring head comprises at least a first and a second optical measuring path, each of which extends approximately perpendicularly to the linear adjustment path of the measuring head. The measuring head may, for example, have at least two legs arranged at a distance from one another and adjustable relative to one another, in each of which at least one optical sensor and at least one light source arranged at a distance from it are provided, each of which forms an optical measuring path. The optical sensor of a measuring path may, for example, be designed as a CMOS or CCD sensor and have telecentric optics.

The beam path between the optical sensor and the light source does not necessarily have to extend in a straight line; it may also be deflected by means of at least one mirror. This allows a relatively compact design of the measuring head to be realized. In particular, this allows the distance of the respective measuring path to the longitudinal axis of the pipe and thus the radius of rotation about the longitudinal axis of the metal pipe to be reduced.

Preferably, at least one of the optical measuring paths or the legs of the measuring head, as the case may be, may be pivoted relative to the respective other measuring path transversely to the linear adjustment path of the measuring head. In this manner, a preferably automatic adjustment and/or adaptation of the measuring head or the position of the measuring paths, as the case may be, to different thread pitch angles may be achieved.

A preferred exemplary embodiment of the method and device is explained below with reference to the accompanying drawings.

BRIEF DESCRIPTION OF THE DRAWINGS

FIG. 2 is a schematic illustration as a side view with the lasers provided on the measuring head for position detection.

DETAILED DESCRIPTION

Figure 1:
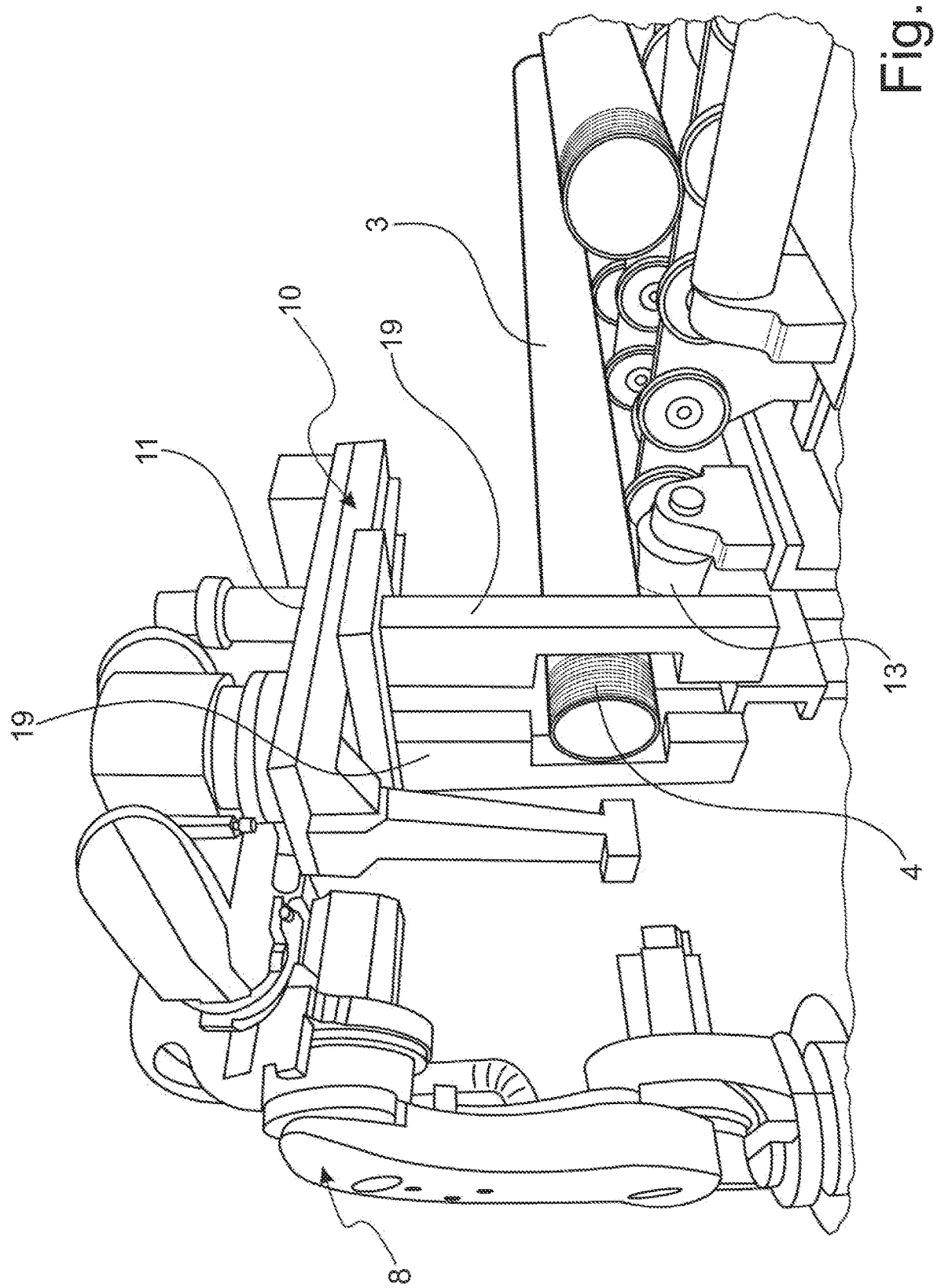
FIG. 1 is a perspective illustration of the measuring head during thread measurement.

A device for optically measuring a thread is shown schematically in FIG. 1. This comprises as a manipulator a robot 8, with a rotatable and pivotable robot arm 9 with preferably five degrees of freedom, at the free end of which a measuring head 10 is arranged. The measuring head 10 comprises a carrier 11 with optical measuring means provided thereon for optical measurement of an external thread 4 provided on a metal pipe 3. The external thread 4 of the metal pipe 3 was previously cut in a machine tool (not shown), for example in the form of a CNC milling machine or a machining center. The metal pipe 3 was then fixed in a defined measurement position, as shown in FIG. 1. The measurement position may be defined, for example, as shown schematically in FIG. 1, by a centrally constricted position roller (diabolo roller) 13 on a roller table 12, wherein the constriction of the position roller 13 determines the position of the metal pipe 3. Alternatively, a lateral stop may be provided to fix the position of the metal pipe 3 to be measured. In the measurement position of the metal pipe 3, the carrier 11 of the measuring head 10 is moved, if necessary after a diameter calibration of the metal pipe 3, into a measurement position, in which the measuring head 10 is aligned relative to the metal pipe.

The diameter calibration of the measuring head 10 serves to position the measuring means of the measuring head 10 relative to the carrier 11 in such a manner that the metal pipe 3 is positioned between the measuring means, such that the measuring head 10 does not collide with the metal pipe 3 during the pre-alignment. For this purpose, a gauge may be arranged in the measurement station as a reference component, on the basis of which the measuring head 10 may be calibrated before the measurement process is carried out.

For positioning or pre-alignment, as the case may be, of the measuring head 10, at least one position detector may be provided on the measuring head 10, which position detector determines the spatial position of the longitudinal axis 2 of the metal pipe 3 before and/or while the measuring head 10 is moved into the measurement position shown in FIG. 1. The actual course of the longitudinal axis 2 of the metal pipe 3 may deviate from a target course of the longitudinal axis 2. To detect the actual course of the longitudinal axis 2 of the metal pipe 3, the measuring head 10 comprises a first and a second line laser 6,7 as position detectors, with the aid of which the position of the measuring head 10 relative to the metal pipe 3 fixed in the measurement position may be checked and, if necessary, corrected.

The arrangement of the first and second line lasers 6, 7 on the measuring head is shown schematically in FIG. 2. The first line laser 6 extends at approximately a 90° angle relative to a target course of the longitudinal axis 2 of the metal pipe 3, or at a 90° angle in relation to a linear adjustment path of the measuring head 10. The second line laser 7 extends approximately parallel to a target course of the longitudinal axis 2 of the metal pipe 3 or parallel to a target course of the longitudinal axis of the second metal pipe 3, as the case may be, or parallel to the linear adjustment path of the measuring head 10. The second line laser 7 is arranged at the level of the target position of the longitudinal axis 2 of the metal pipe 3 on a non-pivotable leg 19 of the measuring head 10.

The method comprises both a pre-alignment of the measuring head 10 or a positioning of the measuring head 10, as the case may be, in the measurement position shown in FIG. 1 by a corresponding control of the robot arm 3 and a fine alignment of the measuring head 10 in the measurement position by adjusting the measuring head 10 relative to the carrier 11. The fine alignment comprises aligning at least one measuring path 16 in relation to the longitudinal axis 2 of the metal pipe 3 by pivoting the measuring head about a pivot axis 1 extending approximately transversely to the longitudinal axis 2 of the metal pipe.

As mentioned above, the measuring head 10 is linearly movable relative to the carrier and preferably pivotable about at least one axis. The linear adjustment can be achieved, for example, by means of at least one driven recirculating ball screw or by means of at least one lantern pinion. The adjustment about the pivot axis 1 can be accomplished, for example, by means of an electric rotary drive, which is not shown.

The measuring means for measuring the external thread 4 are each arranged in legs 19 of the measuring head 10. The legs 19 of the measuring head 10 are linearly adjustable in their distance relative to one another. The legs 19 of the measuring head 10 form a U-shaped enclosure of the metal pipe 3. These may both be formed independently and adjustable relative to one another. With the described exemplary embodiment, it is provided that one leg 19 of the measuring head 10 is arranged in a stationary manner, whereas the other leg 19 of the measuring head 10 is adjustable relative to the opposite leg 19 of the measuring head 10. For the purpose of adjusting the measuring head 10 to different thread pitches, it is provided that the legs 19 of the measuring head 10 may be pivoted relative to one another about an axis transverse to the linear adjustment path of the measuring head 10.

Figure 3C:
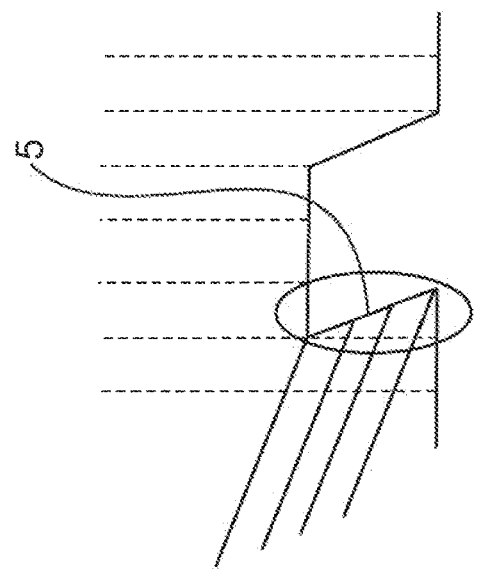
FIG. 3a is an illustration of the optical measuring principle as a view in the direction of the longitudinal axis of the metal pipe, FIG. 3b a side view of the optical measuring principle with an additional light section sensor for measuring undercut thread flanks and FIG. 3c a schematic illustration of the measuring principle for the measurement of undercut thread flanks.
Figure 3B:
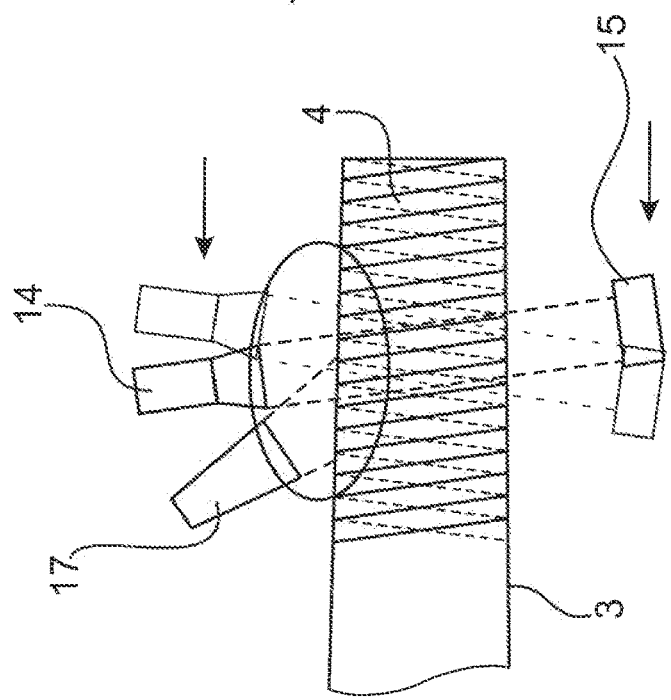
Figure 3A:
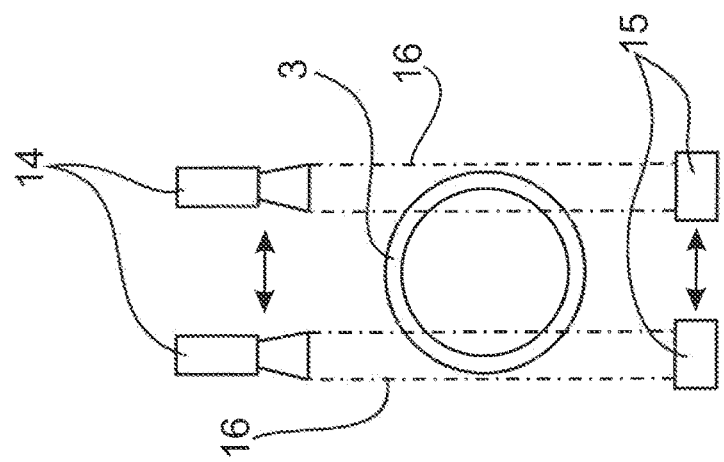

In each of the legs 19 of the measuring head 10, a camera 14 with telecentric optics and a light source 15 positioned opposite the camera are provided as measuring means, as shown for example in FIG. 3a. The camera 14 and the light source 15 are each arranged opposite one another at a distance from one another, forming a measuring path 16, wherein the measuring path 16 may be formed as a straight measuring path 16. The beam path between the camera 14 and the light source 15 may alternatively be deflected via mirrors.

The measuring principle is explained below with reference to FIGS. 3a, 3b and 3c. Each measuring path 16 detects a part of the external thread profile on one side of the metal pipe, wherein the projection of a part of the external thread 4, generated by a light source 15, appears by means of telecentric optics on a light-sensitive sensor, for example a CMOS or a CCD sensor, arranged in a camera 14. The use of telecentric lenses on the cameras 14 ensures that the projection detected by the respective sensor can be recorded undistorted and true to scale. The measured data of the external thread 4 detected in this manner are recorded and compared with the target profile of the external thread 4. The two measuring paths 16 may form a single measuring channel.

With one variant of the measuring head 10, it is provided that it comprises at least one light section sensor 17, which is formed as a laser section sensor and which is aligned with a thread flank 5 of the external thread 4. The measurement of the thread flanks 18 is illustrated in FIG. 3c.

In a control unit, which is not shown, the measured data of the external thread profile and/or a sealing lip of the external thread 4 is evaluated, and control commands for controlling the machine tool are derived, in particular in the case of a deviation between the target profile and the actual profile documented by the measured data. The respective target profile can, for example, be freely selectable in an operator interface (HMI) from a catalog of different thread types.

The measuring head 10 and the controller of the machine tool form a preferably closed control loop. Control commands may be, for example, the readjustment of the tool positions, the selection of the tools, the rotation speed and the torque that is thereby applied of the chuck of the machine tool and of the metal pipe 3, the carrying out of a tool change, the change of the cycle time of the machine tool, etc. The control system may be designed as a self-learning control system (AI) and comprise at least one control algorithm for this purpose. The measurement data determined with respect to a pipe are used not only for feedback with the machine tool and for its control, also for quality data assurance and tracking.

LIST OF REFERENCE SIGNS

1 Pivot axis of the measuring head
2 Longitudinal axis of the metal pipe
3 Metal pipe
4 External thread
5 Thread flanks
6 First line laser
7 Second line laser
8 Robot
9 Robot arm
10 Measuring head
11 Carrier
12 Roller table
13 Position roller
14 Camera
15 Light source
16 Measuring path
17 Light section sensor
18 Gauge
19 Leg of the measuring head

The invention claimed is:
1. A device for optically measuring a thread on an end of a metal pipe, comprising:
a carrier fastened to an end of a manipulator; and
a measuring head, the measuring head being freely positionable in relation to the metal pipe,
wherein the measuring head comprises
a linear drive for linearly adjusting the measuring head relative to the carrier along a linear adjustment path, and
a rotary drive for pivoting the measuring head relative to the carrier,
a first leg,
a first camera and a first light source arranged in the first leg, the first camera being arranged opposite the first light source for forming an optical measuring path for measuring the thread,
a first line laser that extends approximately at a right angle to the linear adjustment path of the measuring head,
a second line laser that extends approximately parallel to the linear adjustment path of the measuring head,
wherein the optical measuring path extends approximately perpendicularly to the linear adjustment path of the measuring head.

2. The device according to claim 1,
wherein the manipulator is an industrial robot with an articulated arm having a plurality of degrees of freedom.

3. The device according to claim 1,
wherein the first line laser and/or the second line laser functions as a collision detector which blocks the adjustment of the measuring head and/or movement of the manipulator if the measuring head or parts of the measuring head may collide with the metal pipe.

4. The device according to claim 1,
wherein the measuring head further comprises
a second leg, and
a second camera and a second light source arranged in the second leg, the second camera being arranged opposite the second light source for forming a second optical measuring path,
wherein the optical measuring path and the second optical measuring path both extend approximately perpendicularly to the linear adjustment path of the measuring head.

5. The device according to claim 4,
wherein the first leg and the second leg are arranged at a distance from one another and adjustable relative to one another.

6. The device according to claim 1,
wherein the optical measuring path is pivotable relative to a further optical measuring path transversely to the linear adjustment path of the measuring head.

7. The device according to claim 1,
wherein the first line laser and/or the second line laser determine a spatial position of a longitudinal axis of the metal pipe.

8. The device according to claim 7,
wherein the second line laser is arranged on the first leg at a level of a target position of the longitudinal axis.

* * * * *